(12) United States Patent
Machida et al.

(10) Patent No.: US 9,553,542 B2
(45) Date of Patent: Jan. 24, 2017

(54) POWER TOOL

(71) Applicant: MAKITA CORPORATION, Anjo-shi, Aichi (JP)

(72) Inventors: Yoshitaka Machida, Anjo (JP); Yoshitaka Ichikawa, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 14/744,721

(22) Filed: Jun. 19, 2015

(65) Prior Publication Data

US 2015/0372633 A1 Dec. 24, 2015

(30) Foreign Application Priority Data

Jun. 23, 2014 (JP) ................................ 2014-128572

(51) Int. Cl.
| | | |
|---|---|---|
| *F16D 65/14* | (2006.01) | |
| *H02P 29/00* | (2016.01) | |
| *B25D 16/00* | (2006.01) | |
| *B23D 51/16* | (2006.01) | |
| *B23D 59/00* | (2006.01) | |
| *B25D 11/00* | (2006.01) | |
| *H02P 7/18* | (2006.01) | |

(52) U.S. Cl.
CPC ........... *H02P 29/0011* (2013.01); *B23D 51/16* (2013.01); *B23D 59/001* (2013.01); *B25D 11/00* (2013.01); *B25D 16/00* (2013.01); *B25D 16/006* (2013.01); *H02P 7/18* (2013.01); *B25D 2250/201* (2013.01); *B25D 2250/221* (2013.01)

(58) Field of Classification Search
CPC . B23D 59/001; B25D 11/00; B25D 2250/221; H02P 29/0011; H02P 7/18

IPC ............................................ H02P 29/0011,7/18
See application file for complete search history.

(56) References Cited

U.S. PATENT DOCUMENTS

2015/0372633 A1* 12/2015 Machida .............. B25D 16/006
318/14

FOREIGN PATENT DOCUMENTS

| | | |
|---|---|---|
| DE | 10358571 A1 | 7/2005 |
| EP | 1502710 A2 | 2/2005 |
| EP | 1607186 A1 | 12/2005 |
| JP | 2004-255542 A | 9/2004 |

OTHER PUBLICATIONS

Oct. 22, 2015 extended search report issued in European Patent Application No. 15172825.0.

* cited by examiner

*Primary Examiner* — Karen Masih
(74) *Attorney, Agent, or Firm* — Oliff PLC

(57) ABSTRACT

A hammer drill (100) comprises an electric motor (110), a piston (127) as a driving member and a controller (199) which controls and drives the electric motor (110). The piston (127) is reciprocated by rotation of the electric motor (110) and thereby a hammer bit (119) is driven in its longitudinal direction. The hammer bit (119) is moved forward in response to a forward movement stroke of the piston (127) and thereby a hammering operation is performed by the hammer bit (119). The controller (199) sets a duty ratio of a driving pulse signal which drives the electric motor (110) in the forward movement stroke of the piston (127) to be larger in order to prevent a reduction of a rotation speed of the electric motor (110) due to a load applied on the electric motor (110) during the forward movement stroke of the piston (127).

7 Claims, 5 Drawing Sheets

POWER TOOL

CROSS REFERENCE TO RELATED APPLICATION

The present application claims priority from Japanese Patent Applications No. 2014-128572 filed on Jun. 23, 2014, the entire contents of which are incorporated by reference herein.

FIELD OF THE INVENTION

The present invention relates to a power tool which performs a predetermined operation.

BACKGROUND OF THE INVENTION

Japanese non-examined laid-open Patent Publication No. 2004-255542 discloses an electric hammer which performs a hammering operation by driving a hammer bit. The electric hammer has a motor and a piston, and rotation of the motor is converted into a linear reciprocating motion of the piston. By utilizing the linear motion of the piston, the hammer bit held by a tool holder is hit by a hammering element within the piston via an intermediate element and thereby the hammering operation is performed.

SUMMARY OF THE INVENTION

In the electric hammer described above, the intermediate element hits the hammer bit while the hammer bit is pressed in the tool holder. In this case, the motor is driven at high speed in a state that the hammer bit is pressed in the tool holder (load applied state) compared to a state that the hammer bit is not pressed in the tool holder (no load state). In such a configuration, when the hammer bit is hit and the hammering operation is performed, a rotation speed of the motor is decreased due to the load applied on the motor and thereby the rotation speed of the motor in the load applied state becomes substantially same rotation speed of the motor in the no load state. However, during a reciprocating movement of the piston, the hammering element or the intermediate element as a driving member which drives the hammer bit, the load applied on the motor in a forward stroke of the driving member is different from the load applied on the motor in a backward stroke of the driving member. Thus, more sophisticated control for driving the motor is desired.

Accordingly, an object of the present disclosure is, in consideration of the above described problem, to provide an improved control technique for driving a motor of a power tool.

Above-mentioned problem is solved by the present invention. According to a preferable aspect of the present disclosure, a power tool which drives a tool bit and performs a predetermined operation on a workpiece is provided. The power tool is, for example, constructed as an impact tool such as an electric hammer or an electric hammer drill, or a cutting tool such as an electric jigsaw or a reciprocating saw. In the power tool, as the tool bit is reciprocated, the power tool is also called as a reciprocating power tool. The power tool comprises a motor, a driving member which is driven by the motor and reciprocated, and a controller which controls the motor. The driving member drives the tool bit by means of its reciprocating movement.

In the power tool, a forward movement stroke and a backward movement stroke of the driving member are defined based on the reciprocating movement. Thus, the forward movement stroke and the backward movement stroke define a driving cycle of the driving member. Further, the power tool is configured to perform the predetermined operation on the workpiece by the tool bit in response to one stroke among the forward and backward movement strokes.

In the power tool, a control factor for controlling a driving of the motor is defined by at least one of a voltage value of a voltage applied on the motor and a duty ratio of a driving pulse signal utilized to drive the motor. Further, the controller is configured to set the control factor in said one stroke to be larger than that in another stroke and drive the motor. Namely, the predetermined operation is performed based on movement of the driving member during said one stroke. Thus, value of the control factor during said one stroke is set to be larger than value of the control factor during another stroke.

Typically, a voltage value of the voltage applied on the motor during the said one stroke is set to be larger than the voltage value of the voltage applied on the motor during another stroke, or a duty ratio of a driving pulse signal which is utilized to drive the motor during said one stroke is set to be larger than the duty ratio of the driving pulse signal during another stroke. The standard (reference) voltage value or the standard (reference) duty ratio may be defined, and the controller may set the voltage value and/or the duty ratio during said one stroke to be larger than the standard voltage value and/or the standard duty ratio, or the controller may set the voltage value and/or the duty ratio during another stroke to be smaller than the standard voltage value and/or the standard duty ratio. In this case, the standard voltage value and/or the standard duty ratio may not be limited to a constant value.

Further, the power tool preferably comprises a position detector which detects a position of the driving member. The controller detects the forward movement stroke and/or the backward movement stroke of the driving member based on a detected result of a position of the driving member by the position detector.

According to this aspect, the tool bit is driven in response to the forward movement stroke or the backward movement stroke of the reciprocated driving member and thereby the operation is performed. That is, for example, in a case that the operation is performed by a movement of the tool bit in response to the forward movement stroke of the driving member, the operation is not performed by a movement of the tool bit in response to the backward movement stroke of the driving member. During the operation corresponding to the forward movement stroke of the driving member, relatively high load is applied on the motor which drives the driving member. Accordingly, the controller sets the control factor in one of the forward movement stroke and the backward movement stroke of the driving member to be larger than that in another stroke. In this case, the control factor in the forward movement stroke of the driving member, which causes the operation by the tool bit, is set to be larger than that in the backward movement stroke of the driving member. And the motor is driven and controlled by the controller by utilizing the control factor corresponding to each stroke. Thus, the rotation speed reduction of the motor due to the high load applied on the motor during the stroke of the driving member, which corresponds to the operation, is prevented. Such a driving control of the motor is also called as a rotation speed fluctuation suppressing control. With such a control by the controller, a range of the rotation speed fluctuation of the motor during one driving cycle becomes smaller. That is, by controlling the motor during the one driving cycle in detail more than well-known power tool, the rotation speed fluctuation of the motor during the one driving cycle is suppressed and the motor is stably driven. Further, since the rotation speed fluctuation of the motor due to the load applied on the motor is suppressed, work efficiency of the power tool during the operation is improved.

According to a further preferable aspect of the present disclosure, the power tool comprises a rotation speed detector which detects a rotation speed of the motor. Further, the controller measures a first elapsed time and a second elapsed time during one driving cycle by utilizing a detected result of the rotation speed detector. The first elapsed time is defined by an elapsed time since the beginning of the one driving cycle until the maximum rotation speed of the motor during the one driving cycle is detected by the rotation speed detector. The second elapsed time is defined by an elapsed time since the beginning of the one driving cycle until the minimum rotation speed of the motor during the one driving cycle is detected by the rotation speed detector. Further, the controller is configured to set the control factor in the forward movement stroke and the control factor in the backward movement stroke in the following driving cycle which follows the one driving cycle based on the first and second elapsed times. Accordingly, based on a rotation speed fluctuation of the motor during the predetermined driving cycle, the controller suppresses the rotation speed fluctuation of the motor in the following driving cycle which follows the predetermined driving cycle. That is, the controller predicts the rotation speed fluctuation of the motor in the future driving cycle based on a history of the rotation speed fluctuation of the motor. Thus, the rotation speed fluctuation of the motor in the future driving cycle is effectively suppressed.

According to a further preferable aspect of the present disclosure, the controller calculates a first average time and a second average time. The first average time is an average time of the first elapsed times in a plurality of the driving cycles The second average time is an average time of the second elapsed times in said plurality of the driving cycles. Further, the controller is configured to set the control factor in the forward movement stroke and the control factor in the backward movement stroke based on the first and second average times in the following driving cycle which follows said plurality of the driving cycles. The controller may set each control factor in the forward and backward movement strokes based on the first and second average times in the following several driving cycles which continuously follow said plurality of driving cycles for calculating the first and second average times. By utilizing history of the rotation speed fluctuation of the motor during the plurality of driving cycles, the rotation speed fluctuation of the motor in the future driving cycle(s) is more effectively suppressed.

According to a further preferable aspect of the present disclosure, the power tool comprises a switching mechanism which switches to enable/disenable a motor driving control in which the controller sets the control factor in said one stroke to be larger than that in another stroke. The motor driving control is also called as a rotation speed fluctuation suppressing control. Accordingly, the motor driving control by the controller is enabled or disenabled by switching mechanism.

According to a further preferable aspect of the present disclosure, the power tool is constructed as an electric hammer drill which has a drill mode and a hammer mode as driving modes. In the drill mode, the tool bit is rotationally driven around its longitudinal direction. In the hammer mode, the tool bit is at least linearly driven in its longitudinal direction. The power tool comprises a driving mode switching mechanism which switches the driving mode between the drill mode and the hammer mode. When the driving mode is switched to the drill mode by the driving mode switching mechanism, the motor driving control by the controller is enabled. Further, when the driving mode is switched to the hammer mode by the driving mode switching mechanism, the motor driving control by the controller is disabled. Typically, the driving mode switching mechanism is interlocked with the controller the motor driving control by the controller is automatically enabled and disabled by switching the driving mode by the driving mode switching mechanism. In the hammer mode, the tool bit may also be rotationally driven around its longitudinal direction. Thus, in the hammer mode, a hammering operation in which the tool bit is only linearly driven and/or a hammer drill operation in which the tool bit is linearly and rotationally driven may be accomplished. In the hammer mode, the driving member is periodically reciprocated by the motor, and thereby the tool bit is periodically reciprocated. Namely, load applied on the motor is periodically fluctuated. Accordingly, a frequency of the load fluctuation on the motor is obvious, and the rotation speed fluctuation is effectively suppressed by the motor driving control.

Accordingly, an improved control technique for driving a motor of a power tool is provided.

Other objects, features and advantages of the present disclosure will be readily understood after reading the following detailed description together with the accompanying drawings and the claims.

DESCRIPTION OF THE PREFERRED EMBODIMENTS

Each of the additional features and method steps disclosed above and below may be utilized separately or in conjunction with other features and method steps to provide and manufacture improved power tools and method for using such power tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment

Figure 1:
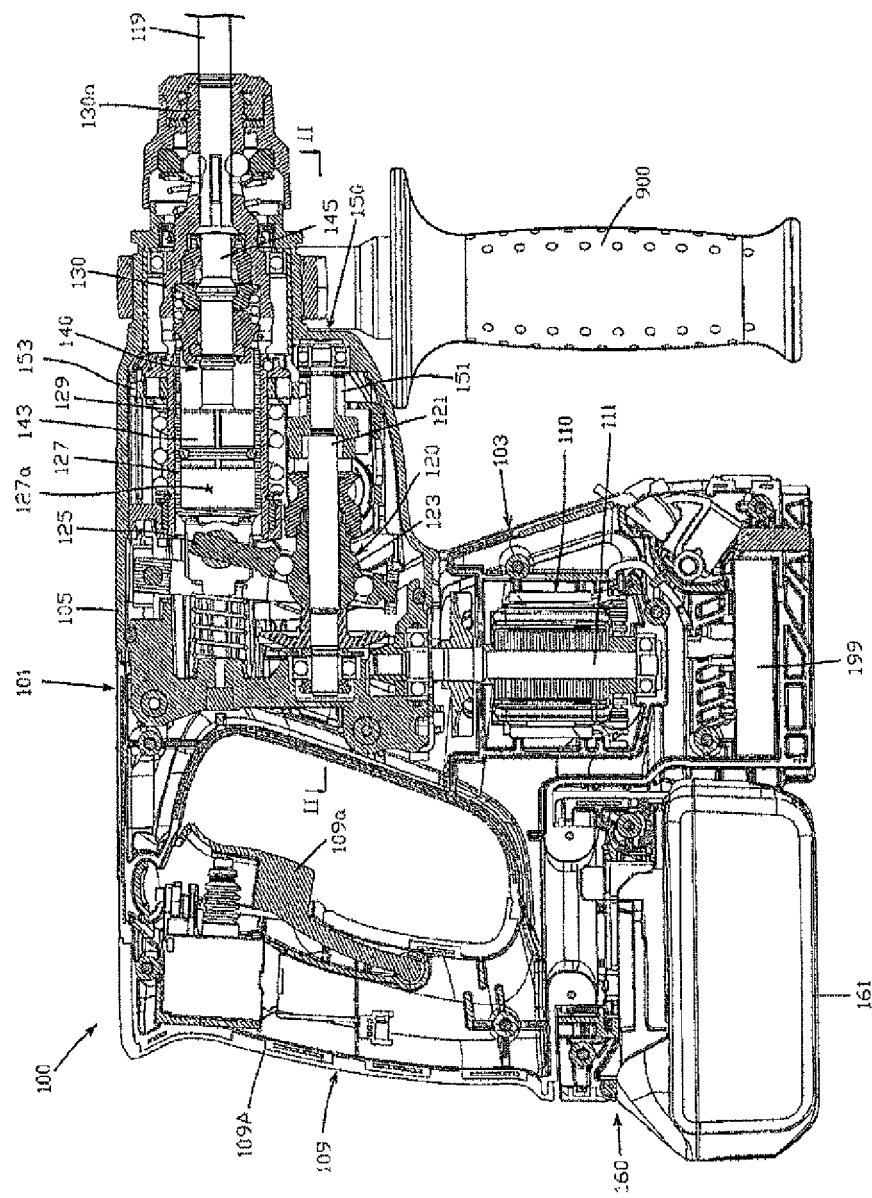
FIG. 1 shows a cross sectional side view of a hammer drill of a representative embodiment according to the present disclosure.

A first embodiment of the present disclosure is explained with reference to FIG. 1 to FIG. 9. In the first embodiment, a hand-held electrical hammer drill is utilized to explain as one example of a power tool. As shown in FIG. 1, a hammer drill 100 is a power tool which has a hammer bit 119 attached to a front end region of a main housing 101 and performs a chipping operation or a hammer drill operation on a workpiece (e.g. concrete) by causing a striking movement in an axial direction of the hammer bit 119 and a rotational movement around the axial direction of the hammer bit 119. The hammer bit 119 is one example which corresponds to "a tool bit" of this disclosure.

The hammer drill 100 is mainly provided with the main housing 101 which forms an outline of the hammer drill 100. The hammer bit 119 is detachably attached to the front end region of the main housing 101 via a tool holder 130. The hammer bit 119 is inserted into a bit insertion hole of the tool holder 130 and held such that it is allowed to reciprocate in its axial direction (longitudinal direction) with respect to the tool holder 130 and prevented from rotating in its circumferential direction with respect to the tool holder 130. Accordingly, the power tool according to this disclosure may be also called as a reciprocating power tool.

The main housing 101 is mainly provided with a motor housing which houses an electric motor 110 and a gear housing 105 which houses a motion converting mechanism 120, a hammering mechanism 140 and a rotation transmitting mechanism 150. A hand grip 109 is connected to the main housing 101 at a side opposite to the hammer bit 119 in the longitudinal direction of the hammer bit 119. The hand grip 109 includes a grip portion 109A which is held by a user. The grip portion 109A extends in a direction (a vertical direction in FIG. 1) crossing the longitudinal direction of the hammer bit 119. An upper end region of the grip portion 109A is connected to the gear housing 105. The upper end region of the grip portion 109A is close to an axial line of the hammer bit 119. A lower end region of the grip portion 109A is connected to the motor housing 103. The lower end region of the grip portion 109A is remote from the axial line of the hammer bit 119. The grip portion 109A is partly disposed on the axial line of the hammer bit 119. For convenience of explanation, the hammer bit 119 side of the hammer drill 100 in the longitudinal direction of the hammer bit 119 is defined as front side, and the hand grip 109 side of the hammer drill 100 in the longitudinal direction of the hammer bit 119 is defined as rear side. Further, with respect to an extending direction of the grip portion 109A, a connection region side between the grip portion 109A and the gear housing 105, which is close to the axial line of the hammer bit 119, is defined as upper side, and a connection region side between the grip portion 109A and the motor housing 103, which is remote from the axial line of the hammer bit 119, is defined as lower side.

The gear housing 105 is arranged at a front side of the hammer drill 100 and the motor housing 103 is arranged below the gear housing 105. The hand grip 109 is connected to a rear end region of the gear housing 105. The electric motor 110 housed in the motor housing 103 is provided as a brushless motor. In the hand-held hammer drill 100, a small size motor is utilized as the electric motor 110 for saving the weight of the hammer drill 100. The electric motor 110 is arranged such that a motor shaft 111 of the electric motor 110 crosses an axial line of the hammer bit 119. The axial line of the hammer bit 119 is also called as a hammering axis. That is, the motor shaft 111 extends in a vertical direction of the hammer drill 100. A controller 199 which controls driving of the electric motor 110 is arranged below the electric motor 110. The electric motor 110 and the controller 199 are examples which correspond to "a motor" and "a controller" of this disclosure, respectively.

Rotation of the motor shaft 111 of the electric motor 110 is converted into a linear motion by the motion converting mechanism 120 and then transmitted to the hammering mechanism 140. As a result, a hammering force (impact force) is generated in the longitudinal direction of the hammer bit 119 via the hammering mechanism 140. Further, rotation of the motor shaft 111 of the electric motor 110 is transmitted to the tool holder 130 via the rotation transmitting mechanism 150 and thereby the hammer bit 119 is rotationally driven around its longitudinal direction. The electric motor 110 is driven when a trigger 109a which is arranged on the hand grip 109 is pulled (manipulated).

As shown in FIG. 1, the motion converting mechanism 120 is arranged above the motor shaft 111 of the electric motor 110. The motion converting mechanism 120 is mainly provided with an intermediate shaft 121 which is rotationally driven by the motor shaft 111, a rotating element 123 which is mounted onto the intermediate shaft 121, a swing member 125 which is swung in a front-rear direction of the hammer drill 100 by rotation of the rotating element 123 (intermediate shaft 121), a cylindrical piston 127 which is reciprocated in the front-rear direction of the hammer drill 100 by swing motion of the swing member 125, and a cylinder 129 which houses the piston 127 in a slidable manner. The intermediate shaft 121 is arranged perpendicular to the motor shaft 111. The piston 127 is a cylindrical member with bottom and slidably houses a striker 143 therein. The cylinder 129 forms a rear end region of the tool holder 130, that is, the cylinder 129 is formed integrally with the tool holder 130.

As shown in FIG. 1, the hammering mechanism 140 is arranged forward of the motion converting mechanism 120 and rearward of the tool holder 130. The hammering mechanism 140 is mainly provided with a hammering element in the form of the striker 143 which is slidably arranged within the piston 127 and an intermediate element in the form of an impact bolt 145 which is arranged forward of the striker 143. An inner space of the piston 127 rearward of the striker 143 forms an air chamber 127a which serves as an air spring. Thus, by the swing motion of the swing member 125 in the front-rear direction of the hammer drill 100, the piston 127 is reciprocated in the front-rear direction and thereby the striker 143 is driven. That is, when the piston 127 is moved forward, the striker 143 is moved forward by the air spring and hits the impact bolt 145 and therefore hammering force of the hammer bit 119 is generated via the impact bolt 145. As a result, a hammering operation on a workpiece is performed by the hammer bit 119. Further, when the piston 127 is moved rearward, negative air pressure which is lower pressure than the atmospheric pressure is occurred within the air chamber 127a and thereby the striker 143 is moved rearward. Further, the striker 143 and the impact bolt 145 are moved rearward by reaction force from a workpiece hammered by the hammer bit 119. As a result, the striker 143 and the impact bolt 145 are reciprocated in the front-rear direction of the hammer drill 100. In such a construction, as the striker 143 and the impact bolt 145 are driven by the air spring, the striker 143 and the impact bolt 145 are moved behind a movement phase of the piston 127.

As shown in FIG. 1, the rotation transmitting mechanism 150 is arranged forward of the motion converting mechanism 120 and below the hammering mechanism 140. The rotation transmitting mechanism 150 is mainly provided with a gear deceleration mechanism which includes a plurality of gears such as a first gear 151 which is rotated integrally with the intermediate shaft 121 and a second gear 153 which is engaged with the first gear 151. The second gear 153 is mounted onto the tool holder 130 (cylinder 129) so as to rotate integrally with the tool holder 130. Thus, rotation of the first gear 151 is transmitted to the tool holder 130 via the second gear 153 and thereby the hammer bit 119 attached to the tool holder 130 is rotated.

As shown in FIG. 1, a battery mounting part 160 to which a battery pack 161 is detachably attached is disposed on the motor housing 103 below the hand grip 109. The battery mounting part 160 is electrically connected to the controller 199. Thus, when the trigger 109a is operated, the controller 199 provides electric current from the battery pack 161 to the electric motor 110 and thereby the electric motor 110 is driven.

The hammer drill 100 has a hammer drill mode and a drill mode as driving modes. In the hammer drill mode, the hammer bit 119 makes a hammering movement in its longitudinal direction and a rotational movement around its longitudinal direction. Thus, the hammer drill operation is performed on a workpiece. In the drill mode, the hammer bit 119 only makes the rotational movement without the hammering movement. Thus, the drill operation is performed on a workpiece.

Figure 2:
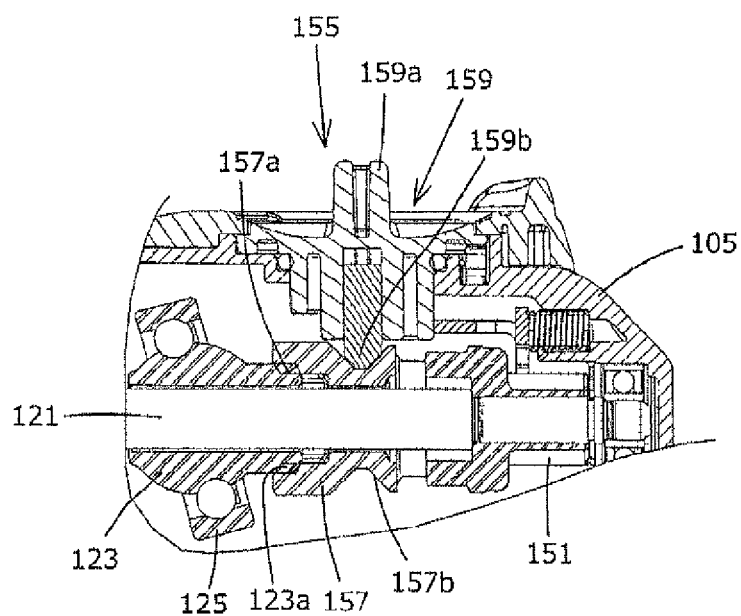
FIG. 2 shows a cross sectional view of a mode switching mechanism of the hammer drill.
Figure 3:
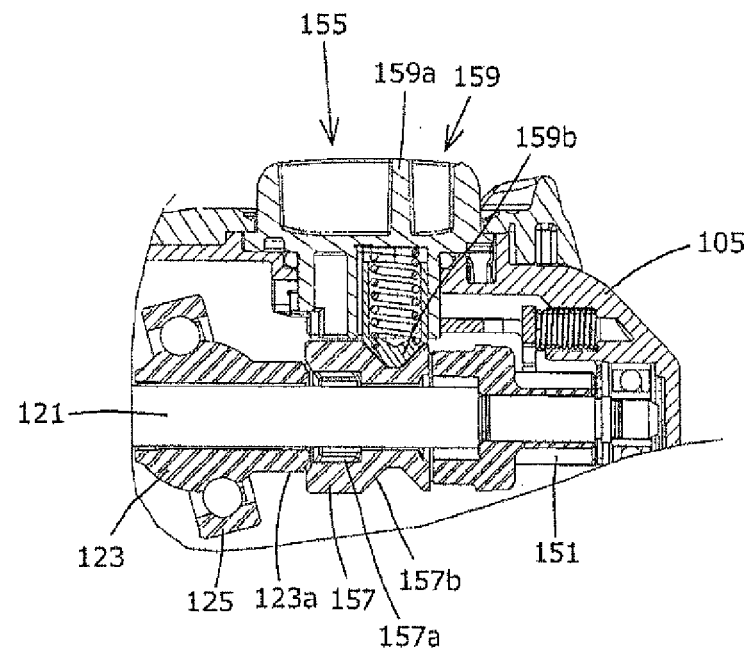
FIG. 3 shows a cross sectional view of the mode switching mechanism of the hammer drill.

As shown in FIG. 2 and FIG. 3, the driving mode is switched by a mode switching mechanism 155. The mode switching mechanism 155 mainly includes a rotation transmitting member 157 and a switching dial 159. The rotation transmitting member 157 is formed as a cylindrical member and movable against the intermediate shaft 121 in an axial direction of the intermediate shaft 121. The rotation transmitting member 157 is connected to the intermediate shaft 121 by a spline connection, and thereby the rotation transmitting member 157 is rotated integrally with the intermediate shaft 121 via the spline connection. The rotation transmitting member 157 has a first engagement part 157a which is engageable with an engagement recess 123a which is formed on the front region of the rotating member 123, and a second engagement part 157b which is engageable with the switching dial 159. The first engagement part 157a is formed on an inner surface of the rotation transmitting member 157. The first engagement part 157a is provided as a spline groove which makes a spline connection with the engagement recess 123a. The second engagement part 157b is formed on an outer surface of the rotation transmitting member 157. The second engagement part 157b is provided as a cam groove extending in the circumference direction of the rotation transmitting member 157.

The switching dial 159 is arranged so as to protrude horizontally from the side surface of the gear housing 105. The switching dial 159 is rotatable around its axis extending in a lateral direction of the hammer drill 100 (vertical direction in FIG. 2) perpendicular to the longitudinal direction of the hammer bit 119 (lateral direction in FIG. 2). The switching dial 159 mainly includes a knob 159a which is manually operated by a user, and an engagement protrusion 159b which is engaged with the second engagement part 157b of the rotation transmitting member 157. The engagement protrusion 159b is substantially conical-shaped part around its axis which is offset (eccentric) from the rotation axis of the switching dial 159. Thus, when the knob 159a is operated and the switching dial 159 is rotated, the engagement protrusion 159b is moved in the front-rear direction of the hammer drill 100. Accordingly, the rotation transmitting member 157 which is engaged with the engagement protrusion 159b is moved in the front-rear direction of the hammer drill 100. That is, the rotation transmitting member 157 is moved between its front position and its rear position by rotation of the switching dial 159. The mode switching mechanism 155 is one example which corresponds to "a driving mode switching mechanism" of this disclosure.

As shown in FIG. 2, when the rotation transmitting member 157 is placed at its rear position, the first engagement part 157a of the rotation transmitting member 157 engages with the engagement recess 123a of the rotating member 123. Thus, rotation of the intermediate shaft 121 is transmitted to the rotating member 123 via the rotation transmitting member 157 and thereby the motion converting mechanism 120 is driven. As a result, the hammering mechanism 140 is driven and the hammer bit 119 is reciprocated in its longitudinal direction. Further, rotation of the intermediate shaft 121 is transmitted to the second gear 153 via the first gear 151 and the tool holder 130 is rotated via the cylinder 129. Thus, the hammer bit 119 is rotated around its longitudinal direction. Accordingly, when the rotation transmitting member 157 is placed at its rear position, the hammer drill mode is set and the hammer drill operation in which the hammer bit 119 makes the rotation movement and the hammering movement is performed.

On the other hand, as shown in FIG. 3, when the rotation transmitting member 157 is placed at its front position, the first engagement part 157a of the rotation transmitting member 157 does not engage with the engagement recess 123a of the rotating member 123. That is, rotation of the intermediate shaft 121 is not transmitted to the rotating member 123. Thus, the motion converting mechanism 120 is not driven and the hammer bit 119 only makes the rotation movement by the rotation transmitting mechanism 150. Accordingly, when the rotation transmitting member 157 is placed at its front position, the drill mode is set and the drill operation in which the hammer bit 119 only makes the rotation movement is performed.

Figure 4:
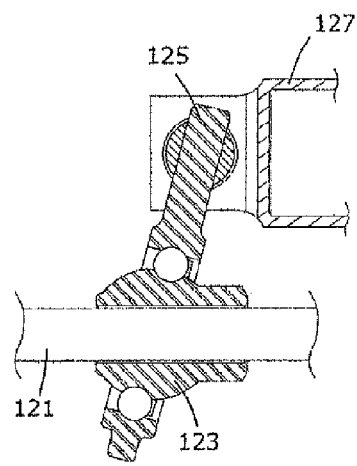
FIG. 4 shows a cross sectional view of a driving of a piston in which the piston is positioned in its front position.
Figure 5:
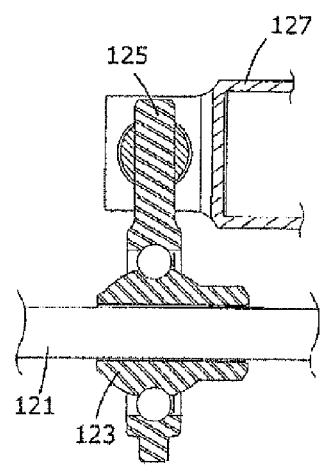
FIG. 5 shows a cross sectional view of a driving of a piston in which the piston is positioned in its neutral position.
Figure 6:
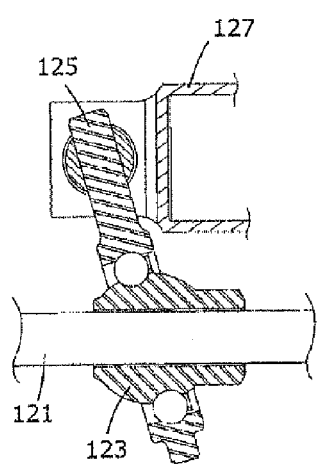
FIG. 6 shows a cross sectional view of a driving of a piston in which the piston is positioned in its rear position.

In the hammer drill mode, when the electric motor 110 is driven, the piston 127 is driven via the swing member 125. That is, as shown in FIG. 4 to FIG. 6, the piston 127 is reciprocated between a front position and a rear position. Right side in FIG. 4 to FIG. 6 corresponds to the front side of the hammer drill 100, and left side in FIG. 4 to FIG. 6 corresponds to the rear side of the hammer drill 100. FIG. 4 shows the front position of the piston 127 and the swing member 125. FIG. 6 shows the rear position of the piston 127 and the swing member 125. FIG. 5 shows an intermediate position of the piston 127 and the swing member 125 between the front position and the rear position. When the piston 127 is driven, volume of the air chamber 127a is fluctuated and thereby air inside the air chamber 127a serves as the air spring which acts on the striker 143. In FIG. 4 to FIG. 6, illustration of the striker 143 is omitted.

When the piston 127 is moved from the rear position toward the front position close to the hammer bit 119, air inside the air chamber 127a is compressed. The movement of the piston 127 from the rear position to the front position is one example which corresponds to "a forward movement stroke" of this disclosure. Further, the forward movement stroke is also called as a compression stroke or a driving stroke. On the other hand, when the piston 127 is moved from the front position toward the rear position, the air inside the air chamber 127a is expanded. The movement of the piston 127 from the front position to the rear position is one example which corresponds to "a backward movement stroke" of this disclosure. Further, the backward movement stroke is also called as an expansion stroke or a non-driving stroke. As described above, a driving cycle of the piston 127 is provided by the forward movement stroke and the backward movement stroke of the piston 127. The piston 127 is one example which corresponds to "a driving member" of this disclosure.

In the forward movement stroke, the air inside the air chamber 127a is compressed and thereby the striker 143 moves forward and hits the impact bolt 145. Thus, the hammer bit 119 is collided by the impact bolt 145 and therefore the hammer bit 119 performs a hammer operation on a workpiece. At this time, the hammer bit 119 is rotationally driven by the rotation transmitting mechanism 150. Accordingly, in response to the forward movement stroke, the hammer bit 119 performs the hammer drill operation on a workpiece. On the other hand, in the backward movement stroke, the air inside the air chamber 127a is expanded and thereby air pressure in the air chamber 127a becomes lower than the atmospheric pressure. Accordingly, the striker 143 is moved rearward as a return movement.

As described above, air pressure in the air chamber 127a is fluctuated by reciprocating movement of the piston 127, and thereby load applied on the electric motor 110 which drives the piston 127 is also fluctuated. Thus, a rotation speed fluctuation of the electric motor 110 is occurred. During the forward movement stroke, the air pressure in the air chamber 127a becomes gradually high, and when the air pressure reaches the predetermined value, the striker 143 is driven (moved) forward. Accordingly, the load applied on the electric motor 110 becomes larger in accordance with the air pressure in the air chamber 127a during the forward movement stroke. Namely, the rotation speed of the electric motor 110 tends to be lower when the load applied on the electric motor 110 becomes larger. On the other hand, during the backward movement stroke, the striker 143 receives reaction force from the impact bolt 145 when the striker 143 collides with the impact bolt 145 and a negative air pressure in the air chamber 127a is occurred. Therefore, the striker 143 is moved rearward by the reaction force and the negative air pressure. Accordingly, the load applied on the electric motor 110 is smaller compared to that during the forward movement stroke. Namely, the rotation speed of the electric motor 110 tends to be higher when the load applied on the electric motor 110 becomes smaller. Based on the fact described above, the controller 199 controls a driving of the electric motor 110 such that the electric motor 110 is driven within a predetermined range of the rotation speed. Namely, the rotation speed fluctuation of the electric motor 110 is kept within the predetermined range of the rotation speed by the controller 199. In other words, the controller 199 controls the electric motor 110 under substantially constant rotation speed state. Such a control is also called as a constant rotation speed control.

Generally, in the constant rotation speed control, the controller compares the rotation speed of the driving electric motor with a predetermined rotation speed (standard rotation speed). When the rotation speed exceeds an upper limit threshold defined in response to the standard rotation speed, the controller controls the electric motor so as to reduce the rotation speed of the electric motor. On the other hand, when the rotation speed is below a lower limit threshold defined in response to the standard rotation speed, the controller controls the electric motor so as to increase the rotation speed of the electric motor. The controller outputs a driving pulse signal to the electric motor and controls the electric motor. That is, the electric motor is controlled on the basis of a PWM (Pulse Width Modulation) control signal by controller. Specifically, the rotation speed of the electric motor is increased by increasing a duty ratio of the driving pulse signal outputted to the electric motor. On the other hand, the rotation speed of the electric motor is decreased by decreasing the duty ratio of the driving pulse signal outputted to the electric motor. In this case, a standard duty ratio (reference duty ratio) of the driving pulse signal is defined by a duty ratio of the driving pulse signal which drives the electric motor at the predetermined substantially constant rotation speed under no-load state.

During the hammer drill operation, the hammer bit 119 is pressed against a workpiece (e.g. concrete). Thus, the striker 143 receives reaction force via the impact bolt 145 in response to hammering force of the hammer bit 119 and thereby the striker 143 is moved rearward. That is, the striker 143 is placed more rearward during the hammer drill operation compared to the striker 143 when the hammer drill operation is not performed. In other words, the rear position of the striker 143 is changed in response to the magnitude of pressing force of the hammer bit 119 during the hammer drill operation. On the other hand, the piston 127 is moved between the predetermined front position and rear position regardless of the hammer drill operation. Accordingly, a distance between the piston 127 and the striker 143 placed at the rear position during the hammer drill operation is shorter compared to that when the hammer drill operation is not performed. Thus, air within the air chamber 127a is more compressed during the hammer drill operation. An air compression rate in the air chamber 127a during the forward movement stroke in the hammer drill operation becomes higher, and thereby load applied on the electric motor 110 which drives the piston 127 becomes larger. As a result, the rotation speed of the electric motor 110 during the forward movement stroke in the hammer drill operation is decreased compared to that when the hammer drill operation is not performed. On the other hand, during the backward movement in the hammer drill operation, the striker 143 receives the reaction force from a workpiece via the impact bolt 145, and thereby the load applied on the electric motor 110 which drives the piston 127 becomes smaller. As a result, the load applied on the electric motor 110 during the backward movement stroke in the hammer drill operation becomes smaller compared to that when the hammer drill operation is not performed, and thereby the rotation speed of the electric motor 110 is increased. That is, during the hammer drill operation, the rotation speed of the electric motor 110 is dramatically changed.

Figure 7:
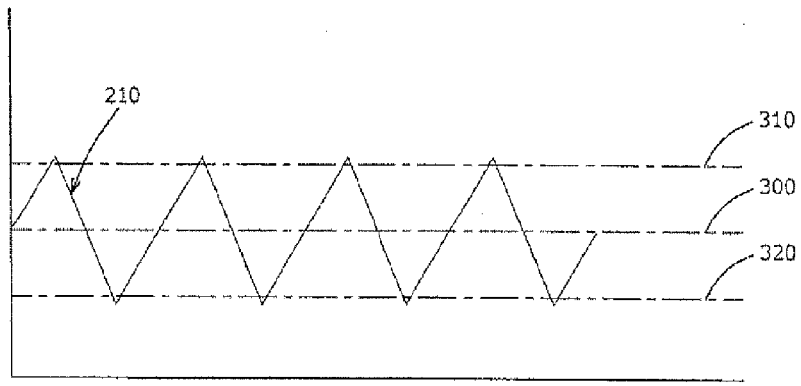
FIG. 7 shows a rotation speed fluctuation of a motor in a state that a hammer drill operation is not performed by a well-known hammer drill without a rotation speed fluctuation suppressing control.
Figure 8:
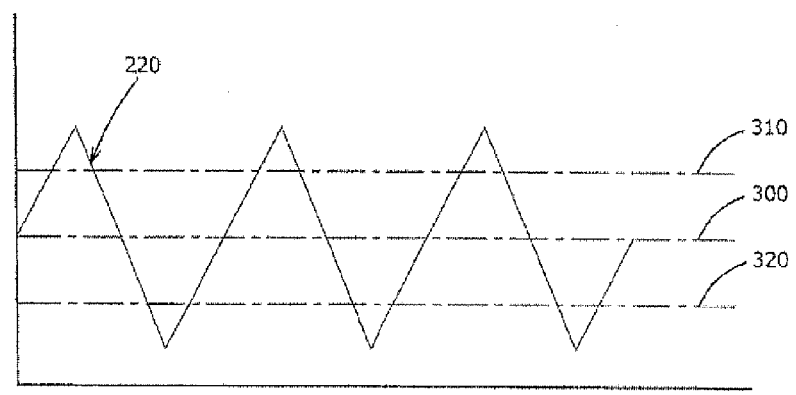
FIG. 8 shows a rotation speed fluctuation of the motor in a state that the hammer drill operation is performed by the well-known hammer drill without the rotation speed fluctuation suppressing control.

Specifically, as shown in FIG. 7, in a well-known hammer drill, when the hammer drill operation is not performed, the rotation speed of the electric motor is fluctuated periodically substantially between a rotation speed upper limit 310 and a rotation speed lower limit 320 which are defined around a standard rotation speed 300 as a center rotation speed in response to a reciprocating movement of the piston. That is, the controller controls the electric motor such that the rotation speed of the electric motor is changed within the predetermined range. On the other hand, in a case that the same control as described above is utilized during the hammer drill operation, since the rotation speed fluctuation is relatively larger during the hammer drill operation as shown in FIG. 8, the rotation speed of the electric motor may possibly be much larger than the rotation speed upper limit 310 or may possibly be much less than the rotation speed lower limit 320. In a case that the rotation speed of the electric motor is below the rotation speed lower limit 320, output (torque multiplied by the rotation speed) of the electric motor becomes smaller and thereby a hammer drill operation efficiency becomes lower. Further, in a case that the rotation speed of the electric motor is above the rotation speed upper limit 310, output of the electric motor becomes unnecessarily larger. In FIG. 7 and FIG. 8, a unit of the horizontal axis is time (second) and a unit of the vertical axis is a rotation speed (rpm) of the electric motor. Further, the rotation speed fluctuations are shown by rotation speed fluctuation waveforms 210, 220 in FIG. 7 and FIG. 8, respectively.

In a small size electric motor 110 of the hammer drill 100, the moment of inertia of a rotor is relatively small and therefore large rotation speed fluctuation may be occurred by load applied on the electric motor 110. Thus, in the hammer drill mode (hammer drill operation), the rotation speed of the electric motor 110 may remarkably go out of the predetermined range of the rotation speed which is defined for the constant rotation speed control. Accordingly, the controller 199 changes the duty ratio of the driving pulse signal from the standard duty ratio based on the load applied on the electric motor 110 and drives the electric motor 110 so that the electric motor 110 is driven within the predetermined range of the rotation speed in the hammer drill mode. As a result, the controller 199 prevents the rotation speed of the electric motor 110 from going out of the predetermined range of the rotation speed. In other words, the controller 199 suppresses the rotation speed fluctuation of the electric motor 110. Such a control based on the load applied on the electric motor 110 is also called as a rotation speed fluctuation suppressing control. Further, in the drill mode (drill operation), the rotation speed is also fluctuated by load applied on the electric motor 110. However, as the rotation speed fluctuation during the drill operation is not occurred periodically, the controller 199 does not change the duty ratio of the driving pulse signal from the standard duty ratio in the drill mode. That is, in the drill mode, the constant rotation speed control is performed but the rotation speed fluctuation suppressing control is not performed. Accordingly, when the hammer drill mode is selected by the mode switching mechanism 155, the rotation speed fluctuation suppressing control to the electric motor 110 is activated by the controller 199 and when the drill mode is selected by the mode switching mechanism 155, the rotation speed fluctuation suppressing control to the electric motor 110 is deactivated.

Figure 9:
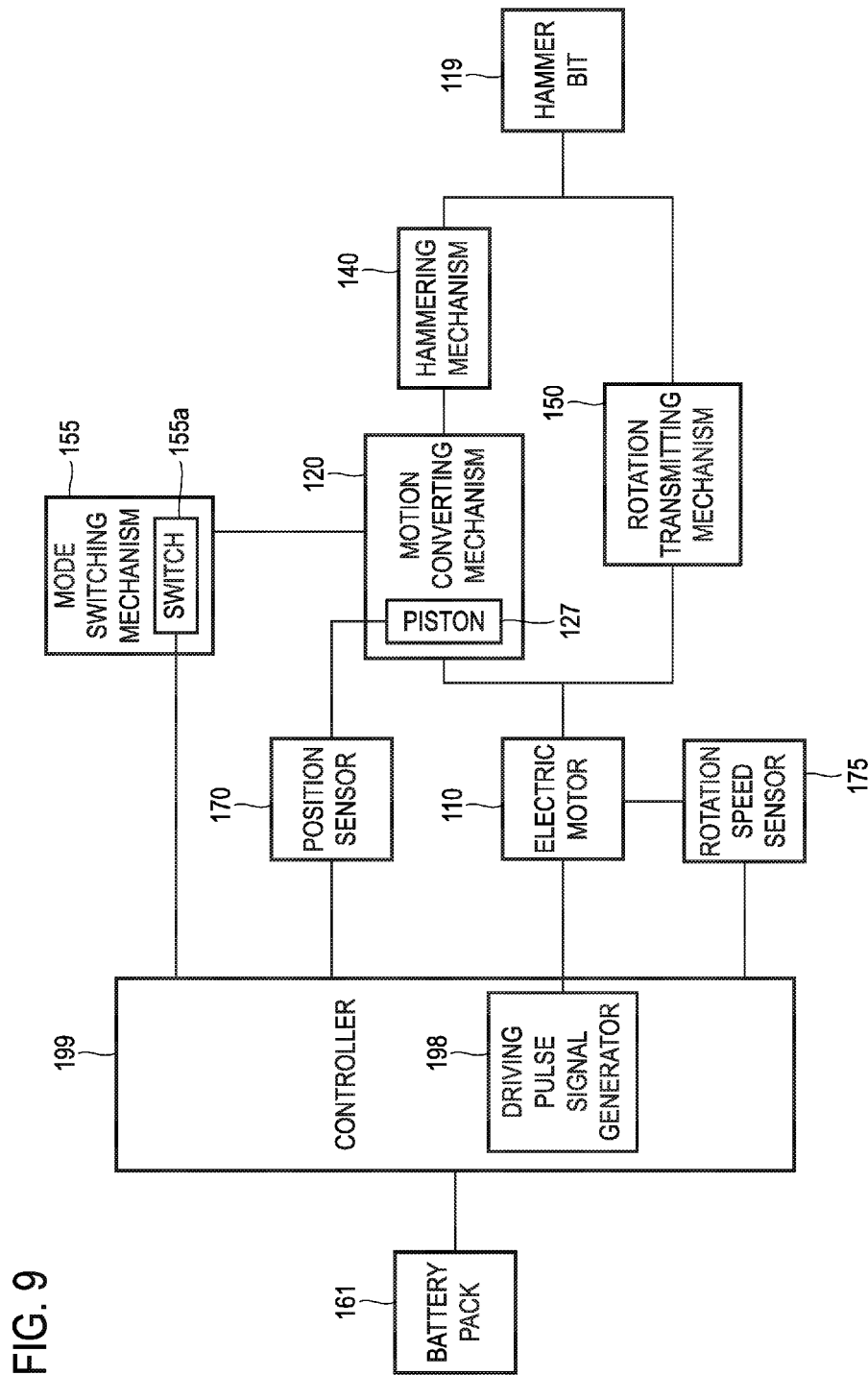
FIG. 9 shows a block diagram of a control system of the hammer drill according to the present disclosure.

Specifically, as shown in FIG. 9, a position sensor 170 which detects a position of the piston 127 for detecting the forward movement stroke and/or the backward movement stroke of the piston 127 is provided. Thus, the controller 199 detects the forward movement stroke and/or the backward movement stroke based on a detected result of the position sensor 170. Further, a rotation speed sensor 175 which measures the rotation speed of the electric motor 110 for detecting the load applied on the electric motor 110 is provided. Thus, the controller 199 detects the load applied on the electric motor 110 based on a detected result of the rotation speed sensor 175. Further, the controller 199 links the rotation speed fluctuation of the electric motor 110 to the driving stroke of the forward movement stroke or the backward movement stroke of the piston 127. The position sensor 170 and the rotation speed sensor 175 may be provided as an electromagnetic sensor or an optical sensor like that.

Further, as shown in FIG. 9, the controller 199 is connected to a switch 155a of the mode switching mechanism 155. The switch 155a is turned on or off based on the driving mode selected by the mode switching mechanism 155. When the hammer drill mode is selected, the switch 155a is turned on and when the drill mode is selected, the switch 155a is turned off. The controller 199 includes a driving pulse signal generator 198 which generates the driving pulse signal to drive the electric motor 110.

When the hammer drill mode is selected and the controller 199 detects the ON state of the switch 155a, the driving pulse signal generator 198 increases the duty ratio of the driving pulse signal with respect to the standard duty ratio during the forward movement stroke in which the load applied on the electric motor 110 becomes relatively larger, and the driving pulse signal generator 198 decreases the duty ratio of the driving pulse signal with respect to the standard duty ratio during the backward movement stroke in which the load applied on the electric motor 110 becomes relatively smaller. The controller 199, based on the rotation speed fluctuation during one driving cycle of the piston 127, controls the rotation speed of the electric motor 110 in a following driving cycle which follows the one driving cycle. In other words, the controller 199 decides a future control of the electric motor 110 based on a history record of the rotation speed fluctuation of the electric motor 110. The duty ratio of the driving pulse signal is decided based on the maximum rotation speed and the minimum rotation speed of the electric motor 110 during the one driving cycle.

Specifically, the controller 199 measures a first time and a second time during the one driving cycle (hereinafter also called as a first driving cycle) based on the rotation speed fluctuation of the electric motor 110 detected by the rotation speed sensor 175. The first time is an elapsed time since the beginning of the one driving cycle until the rotation speed of the electric motor 110 reaches the maximum rotation speed of the electric motor 110. The second time is an elapsed time since the beginning of the one driving cycle until the rotation speed of the electric motor 110 reaches the minimum rotation speed of the electric motor 110. The beginning of the one driving cycle is defined as when the piston 127 is placed at its rear position. Accordingly, in the driving cycle, as the forward movement stroke is prior to the backward movement stroke of the piston 127, the first time is shorter than the second time. In the forward movement stroke, the load applied on the electric motor 110 becomes larger and thereby the rotation speed of the electric motor 110 tends to be decreased. In such a configuration, the forward movement stroke corresponds to a period substantially between the first time and the second time.

Based on the first and second time measured in the first driving cycle, the controller 199 (driving pulse signal generator 198) changes the duty ratio of the driving pulse signal from the standard duty ratio in the following driving cycle (hereinafter also called as a second driving cycle) which follows the first driving cycle. Specifically, the controller 199 (driving pulse signal generator 198) increases the duty ratio of the driving pulse signal which is utilized during a period after the first time is passed since the beginning of the second driving cycle until the second time is passed since the beginning of the second driving cycle with respect to the standard duty ratio. Further, in driving cycles following the second driving cycle, the controller 199, similar to the second driving cycle, utilizes the first and second time measured in the first driving cycle and the driving pulse signal generator 198 increases the duty ratio of the driving pulse signal which is utilized during a period after the first time is passed since the beginning of each driving cycle until the second time is passed since the beginning of each driving cycle with respect to the standard duty ratio. Accordingly, a decrease of the rotation speed of the electric motor 110 is prevented during the forward movement stroke in which the load applied on the electric motor 110 is relatively large.

Further, the controller 199 (driving pulse signal generator 198) decreases the duty ratio of the driving pulse signal which is utilized during a period after the second time is passed since the beginning of the second driving cycle by utilizing the second time measured in the first driving cycle with respect to the standard duty ratio. Further, in the driving cycles following the second driving cycle, the controller 199, similar to the second driving cycle, utilizes the first and second time measured in the first driving cycle and the driving pulse signal generator 198 decreases the duty ratio of the driving pulse signal which is utilized during a period after the second time is passed since the beginning of each driving cycle with respect to the standard duty ratio. Accordingly, an inadvertent increase of the rotation speed of the electric motor 110 is prevented during the backward movement stroke in which the load applied on the electric motor 110 is relatively small.

As described above, the driving pulse signal generator 198 increases the duty ratio of the driving pulse signal from the standard duty ratio in the forward movement stroke, and decreases the duty ratio of the driving pulse signal from the standard duty ratio in the backward movement stroke, however, it is not limited to this. For example, the driving pulse signal generator 198 may change the duty ratio of the driving pulse signal which is only utilized during one of the forward movement stroke and the backward movement stroke from the standard duty ratio. In other words, the duty ratio of the driving pulse signal in the forward movement stroke is set to be larger than that in the backward movement stroke.

Further, the driving pulse signal generator 198 decides the duty ratio of the driving pulse signal in the driving cycles after the second driving cycle in the same way based on the rotation speed fluctuation of the electric motor 110 in the first driving cycle, however, it is not limited to this. For example, the driving pulse signal generator 198 may decide the duty ratio only in the second driving cycle based on the rotation speed fluctuation of the electric motor 110 in the first driving cycle. That is, the duty ratio of the driving pulse signal in a third driving cycle following the second driving cycle may be decided based on the rotation speed fluctuation of the electric motor 110 in the second driving cycle. In other words, based on the load applied on the electric motor 110 in the one driving cycle, the driving pulse signal generator 198 may decide the duty ratio of the driving pulse signal which is utilized in the next driving cycle following one driving cycle.

Second Embodiment

Next, a second embodiment of this disclosure is explained. In the first embodiment, the duty ratio of the driving pulse signal is decided by the rotation fluctuation of the electric motor 110 in a single driving cycle during the hammer drill operation. On the other hand, in the second embodiment, the duty ratio of the driving pulse signal is decided by the rotation fluctuation of the electric motor 110 during a plurality of driving cycles. That is, the rotation speed fluctuation suppressing control in the second embodiment is different from that in the first embodiment. Other features in the hammer drill 100 in the second embodiment are similar to those in the first embodiment and explanation thereof is therefore omitted.

The controller 199 measures each first and second time in each driving cycle. Each first time is an elapsed time since the beginning of each driving cycle until the rotation speed of the electric motor 110 reaches the maximum rotation speed of the electric motor 110 in each driving cycle. Each second time is an elapsed time since the beginning of each driving cycle until the rotation speed of the electric motor 110 reaches the minimum rotation speed of the electric motor 110 in each driving cycle. Further, the controller 199 calculates an average time (a first average time) of a plurality of the first times and an average time (a second average time) of a plurality of the second times. For example, the first average time and the second average time are calculated based on three first times and second times during three driving cycles, respectively. Further, the controller 199 (the driving pulse signal generator 198) decides the duty ratio of the driving pulse signal which is utilized in the driving cycle (hereinafter called as a following driving cycle) following the plurality of the driving cycles based on the first and second average times.

In the following driving cycle, the driving pulse signal generator 198 increases the duty ratio of the driving pulse signal which is utilized during a period after the first average time is passed since the beginning of the following driving cycle until the second average time is passed since the beginning of the following driving cycle with respect to the standard duty ratio. On the other hand, the driving pulse signal generator 198 decreases the duty ratio of the driving pulse signal which is utilized during a period after the second average time is passed since the beginning of the following driving cycle with respect to the standard duty ratio. That is, in each driving cycle, the duty ratio of the driving pulse which is utilized in each driving cycle is changed from the standard duty ratio in accordance with the first and second average times during the plurality of driving cycles prior to the each driving cycle.

According to the first and second embodiments, the duty ratio of the driving pulse signal during the forward movement stroke of the piston 127 is increased with respect to the standard duty ratio. Thus, a decrease of the rotation speed of the electric motor 110 caused by relatively large load applied on the electric motor 110 during the hammer drill operation is prevented. Further, the duty ratio of the driving pulse signal during the backward movement stroke of the piston 127 is decreased with respect to the standard duty ratio. Thus, an inadvertent increase of the rotation speed of the electric motor 110 caused by relatively small load applied on the electric motor 110 during the hammer drill operation. As a result, the rotation speed fluctuation of the electric motor 110 is suppressed and thereby the electric motor 110 is driven stably.

Further, the controller 199 decides the duty ratio of the driving pulse signal which is utilized in the following driving cycle based on the rotation speed fluctuation of the electric motor 110 during the driving cycle(s) prior to the following driving cycle. That is, based on the history of the periodic (cyclic) rotation speed fluctuation of the electric motor 110, the duty ratio of the driving pulse signal during the future driving cycle (following driving cycle) is decided. Thus, the periodic rotation speed fluctuation of the electric motor 110 during the following driving cycles is effectively prevented. Further, by averaging the maximum and minimum rotation speed of the electric motor 110 during the plurality of the driving cycles, the rotation speed fluctuation of the electric motor 110 during the following driving cycles is more effectively prevented.

Further, the controller 199 drives the electric motor 110 by the rotation speed fluctuation suppressing control during the hammer drill operation, and thereby the periodic rotation speed fluctuation of the electric motor 110 caused by the periodic load on the electric motor 110 in response to the periodic hammering movement of the hammer bit 119 is suppressed.

In the first and second embodiments, the duty ratio as a control factor for controlling the electric motor 110 is changed with respect to the standard duty ratio, however, it is not limited to this. For example, voltage value and/or current value of the driving pulse signal for driving the electric motor 110 may be utilized as a control factor. That is, voltage value and/or current value may be changed with respect to a standard voltage value and/or standard current value.

Further, in the first and second embodiments, the mode switching mechanism 155 switches to enable or disenable the rotation speed fluctuation suppressing control by the controller 199. Namely, rotation speed fluctuation suppressing control enabled state and disenabled state of the controller 199 against the electric motor 110 are switched based on a switching of the driving mode by the mode switching mechanism 155, however, it is not limited to this. For example, an exclusive switch for switching the rotation speed fluctuation suppressing control enabled state and disenabled state may be provided. The exclusive switch may be manually operated by a user.

Further, in the first and second embodiment, the hammer drill 100 may be changeable in various ways. For example, the electric motor 110 may be arranged such that the motor shaft 111 of the electric motor 110 is parallel to an axis line of the hammer bit 119. Further, only one end of the hand grip 109 in its extending direction (vertical direction of the hammer drill 100) may be connected to the main housing 101. That is, the hand grip 109 may be formed as a cantilever, one end of which is connected to the main housing 101. Further, a power supply cable may be provided instead of the battery mounting part 160. That is, the hammer drill 100 may be driven by electric current provided from an external power source through the power supply cable instead of the battery pack 161. Further, the electric motor 110 may be provided as a brush motor instead of the brushless motor. Further, the motion converting mechanism 120 may comprises a crank mechanism which includes a crank shaft and a connection rod instead of the swing member 125.

Further, the power tool according to this disclosure is not limited to the hammer drill. For example, the power tool according to this disclosure includes a cutting machine which reciprocates a cutting blade such as an electric jigsaw or a reciprocating saw. Generally, a cutting of a workpiece by the cutting machine is performed during a forward movement or a backward movement of the blade. Thus, the load applied on the electric motor is increased in one of the forward movement or the backward movement corresponding to the cutting operation. In a case that the cutting of the workpiece is performed during the forward movement of the blade, the duty ratio of the driving pulse signal utilized during the forward movement is set to be larger than the standard duty ratio (reference duty ratio). Similarly, in a case that the cutting of the workpiece is performed during the backward movement of the blade, the duty ratio of the driving pulse signal utilized during the backward movement is set to be larger than the standard duty ratio. That is, with respect to the driving cycle of the reciprocating movement of the blade, the duty ratio of the driving pulse signal utilized when the cutting of the workpiece is performed is set to be larger than the duty ratio of the driving pulse signal utilized when the cutting of the workpiece is not performed. Further, in such a cutting machine, a blade holding member which holds and reciprocates the blade is one example which corresponds to "a driving member" of this disclosure. On the other hand, in a case that the blade is constructed such that the cutting of the workpiece is performed both in the forward movement and the backward movement of the blade, the rotation speed fluctuation suppressing control is disabled and the standard duty ratio is utilized to the driving pulse signal for driving the electric motor.

Having regard to an aspect of this disclosure, following features are provided. Each feature may be utilized independently or in conjunction with other feature(s) or claimed invention(s).

(Feature 1)

A reciprocating power tool which drives a tool bit and performs a predetermined operation on a workpiece, comprising:

a motor, a driving member which is driven by the motor and is caused a reciprocating movement, the driving member driving the tool bit by the reciprocating movement, and a controller which drives and controls the motor, wherein, in a driving cycle which is defined by a forward movement stroke and a backward movement stroke of the reciprocating movement of the driving member, the reciprocating power tool performs the predetermined operation on the workpiece by the tool bit in response to one of the forward movement stroke and the backward movement stroke, the controller sets a control factor for controlling a driving of the motor in one stroke corresponding to performing the predetermined operation to be larger than the control factor in another stroke, the control factor being defined by at least one of a voltage value of a voltage applied on the motor and a duty ratio of a driving pulse signal utilized to drive the motor, and the controller performs a rotation speed reduction suppressing control which controls the motor by utilizing the control factor such that a rotation speed of the motor is prevented from decreasing below a predetermined threshold of the rotation speed due to a load applied on the motor in said one stroke.

(Feature 2)

The controller sets the duty ratio of the driving pulse signal utilized in said one stroke to be larger than a reference duty ratio, and the controller sets the duty ratio of the driving pulse signal utilized in another stroke to be smaller than the reference duty ratio.

(Feature 3)

The controller sets the control factor such that an average value of the control factor of the driving pulse signal in said one driving cycle is larger than an average value of the control factor of the driving pulse signal in another driving cycle.

(Feature 4)

The reciprocating power tool is constructed as an electric hammer drill which has a drill mode in which the tool bit is rotationally driven around its longitudinal direction and a hammer mode in which the tool bit is at least linearly driven in its longitudinal direction as driving modes, wherein the reciprocating power tool further comprises a driving mode switching mechanism which switches the driving mode between the drill mode and the hammer mode, when the driving mode is switched to the drill mode by the driving mode switching mechanism, the rotation speed reduction suppressing control by the controller is enabled, and when the driving mode is switched to the hammer mode by the driving mode switching mechanism, the rotation speed reduction suppressing control by the controller is disabled.

(Feature 5)

The driving member is defined by a piston which is linearly reciprocated on a predetermined driving line by the motor.

(Feature 6)

A power tool which drives a tool bit and performs a predetermined operation on a workpiece, comprising:

a motor, a driving member which is driven by the motor and is caused a reciprocating movement, wherein the driving member drives the tool bit by the reciprocating movement, a controller which drives and controls the motor, a rotation speed detector which detects a rotation speed of the motor, and a control factor for controlling a driving of the motor, wherein in a driving cycle which is defined by a forward movement stroke and a backward movement stroke of the driving member, the controller detects a maximum speed detected time and a minimum speed detected time by means of a detected result of the rotation speed detector, the maximum speed detected time being defined by an elapsed time since the beginning of one driving cycle until the maximum rotation speed of the motor during said one driving cycle is detected, the minimum speed detected time being defined by an elapsed time since the beginning of said one driving cycle until the minimum rotation speed of the motor during said one driving cycle is detected, and the controller sets the control factor during a period from the maximum speed detected time to the minimum speed detected time to be larger than the control factor during a period from the minimum speed detected time to the maximum speed detected time and drives the motor by utilizing the control factor.

The correspondence relationships between components of the embodiments and claimed inventions are as follows. The embodiments describe merely examples of configurations for carrying out the claimed inventions. However the claimed inventions are not limited to the configurations of the embodiments.

The hammer drill 100 is one example of a configuration that corresponds to "a power tool" of the invention.

The hammer bit 119 is one example of a configuration that corresponds to "a tool bit" of the invention.

The electric motor 110 is one example of a configuration that corresponds to "a motor" of the invention.

The piston 127 is one example of a configuration that corresponds to "a driving member" of the invention.

The striker 143 is one example of a configuration that corresponds to "a driving member" of the invention.

The controller 199 is one example of a configuration that corresponds to "a controller" of the invention.

The mode switching mechanism 155 is one example of a configuration that corresponds to "a driving mode switching mechanism" of the invention.

The position sensor 170 is one example of a configuration that corresponds to "a position detector" of the invention.

The rotation speed sensor 175 is one example of a configuration that corresponds to "a rotation speed detector" of the invention.

DESCRIPTION OF NUMERALS

100 hammer drill
101 main housing
103 motor housing
105 gear housing
109 hand grip
109A grip portion
109*a* trigger
110 electric motor
111 motor shaft
119 hammer bit
120 motion converting mechanism
121 intermediate shaft
123 rotating element
123*a* engagement recess
125 swing member
127 piston
127*a* air chamber
129 cylinder
130 tool holder
140 hammering mechanism
143 striker
145 impact bolt
150 rotation transmitting mechanism
151 first gear
153 second gear
155 mode switching mechanism
155*a* switch
157 rotation transmitting member
157*a* first engagement part
157*b* second engagement part
159 switching dial
159*a* knob
159*b* engagement protrusion
160 battery mounting part
161 battery pack
170 position sensor
175 rotation speed sensor
198 driving pulse signal generator
199 controller
210 rotation speed fluctuation waveform
220 rotation speed fluctuation waveform
300 standard rotation speed
310 rotation speed upper limit
320 rotation speed lower limit

The invention claimed is:

1. A power tool which drives a tool bit and performs a predetermined operation on a workpiece, comprising:
   a motor, a driving member which is driven by the motor and reciprocated, wherein the driving member drives the tool bit by means of its reciprocating movement, and a controller which controls the motor, wherein, in a driving cycle which is defined by a forward movement stroke and a backward movement stroke of the driving member, the power tool is configured to perform the predetermined operation on the workpiece by the tool bit in response to one stroke among the forward and backward movement strokes, a control factor for controlling a driving of the motor is defined by at least one of a voltage value of a voltage applied on the motor and a duty ratio of a driving pulse signal utilized to drive the motor, and the controller is configured to set the control factor in said one stroke to be larger than that in another stroke and drive the motor.

2. The power tool according to claim 1, comprising a position detector which detects a position of the driving member, wherein the controller detects the forward movement stroke and/or the backward movement stroke of the driving member based on a detected result of a position of the driving member by the position detector.

3. The power tool according to claim 1, comprising a rotation speed detector which detects a rotation speed of the motor, wherein the controller measures a first elapsed time and a second elapsed time during one driving cycle by utilizing a detected result of the rotation speed detector, the first elapsed time being defined by an elapsed time since the beginning of the one driving cycle until the maximum rotation speed of the motor during the one driving cycle is detected by the rotation speed detector, the second elapsed time being defined by an elapsed time since the beginning of the one driving cycle until the minimum rotation speed of the motor during the one driving cycle is detected by the rotation speed detector, and the controller is configured to set the control factor in the forward movement stroke and the control factor of the backward movement stroke in the following driving cycle which follows the one driving cycle based on the first and second elapsed times.

4. The power tool according to claim 3, wherein the controller calculates a first average time and a second average time, the first average time being an average time of the first elapsed times in a plurality of the driving cycles, the second average time being an average time of the second elapsed times in said plurality of the driving cycles, and the controller is configured to set the control factor in the forward movement stroke and the control factor of the backward movement stroke based on the first and second average times in the following driving cycle which follows said plurality of the driving cycles.

5. The power tool according to claim 4, wherein the controller is configured to set the control factor in the forward movement stroke and the control factor of the backward movement stroke based on the first and second average times in the following plurality of driving cycles which follow said plurality of driving cycles for calculating the first and second average times.

6. The power tool according to claim 1, comprising a switching mechanism which switches to enable/disenable a motor driving control in which the controller sets the control factor in said one stroke to be larger than that in another stroke.

7. The power tool according to claim 6, wherein the power tool is constructed as an electric hammer drill which has a drill mode in which the tool bit is rotationally driven around its longitudinal direction and a hammer mode in which the tool bit is at least linearly driven in its longitudinal direction as driving modes, the power tool comprises a driving mode switching mechanism which switches the driving mode between the drill mode and the hammer mode, when the driving mode is switched to the drill mode by the driving mode switching mechanism, the motor driving control by the controller is enabled, and when the driving mode is switched to the hammer mode by the driving mode switching mechanism, the motor driving control by the controller is disabled.

* * * * *